US012046158B2

(12) United States Patent
Katayama

(10) Patent No.: US 12,046,158 B2
(45) Date of Patent: Jul. 23, 2024

(54) CONTROLLER, METHOD FOR MANUFACTURING CONTROLLER, SIMULATED EXPERIENCE SYSTEM, AND SIMULATED EXPERIENCE METHOD

(71) Applicant: Kurume University, Kurume (JP)

(72) Inventor: Reiji Katayama, Kurume (JP)

(73) Assignee: Kurume University, Kurume (JP)

( * ) Notice: Subject to any disclaimer, the term of this patent is extended or adjusted under 35 U.S.C. 154(b) by 647 days.

(21) Appl. No.: 17/273,156

(22) PCT Filed: Aug. 23, 2019

(86) PCT No.: PCT/JP2019/033048
§ 371 (c)(1),
(2) Date: Mar. 3, 2021

(87) PCT Pub. No.: WO2020/050063
PCT Pub. Date: Mar. 12, 2020

(65) Prior Publication Data
US 2021/0327294 A1  Oct. 21, 2021

(30) Foreign Application Priority Data
Sep. 3, 2018  (JP) .................. 2018-164929

(51) Int. Cl.
*G09B 9/00* (2006.01)
*B29C 64/393* (2017.01)
(Continued)

(52) U.S. Cl.
CPC .............. *G09B 9/00* (2013.01); *B29C 64/393* (2017.08); *B33Y 50/02* (2014.12); *G06F 3/04815* (2013.01); *G09B 23/36* (2013.01)

(58) Field of Classification Search
CPC . G09B 9/00; G09B 23/36; G09B 5/02; G09B 23/28; G09B 23/30; B29C 64/393;
(Continued)

(56) References Cited

U.S. PATENT DOCUMENTS

2008/0221442 A1 * 9/2008 Tolkowsky .......... A61B 6/5217
378/22
2009/0035741 A1 2/2009 Riener et al.
(Continued)

FOREIGN PATENT DOCUMENTS

CN 102036616 A * 4/2011 ............ A61B 19/00
CN 104936545 A * 9/2015 ............ A61B 10/04
(Continued)

OTHER PUBLICATIONS

Elecom, "M-VRF01 series, VR mouse", https://www.elecom.co.jp/products/M-VRF01BK.html, published date of Sep. 12, 2017.
(Continued)

*Primary Examiner* — Kandasamy Thangavelu
(74) *Attorney, Agent, or Firm* — Heedong Chae; Lucem, PC

(57) ABSTRACT

A simulated experience system that includes a video display device that is an HMD; a controller that has a body part that is a full-scale simulation of a human liver and a signal oscillator; a computer connected to the video display device and the controller, and having a signal receiver, an arithmetic unit, a video generator, a synchronization processing unit, a video output unit, a storage unit, an additional video generator, and a video synthesizer; and an infrared radiation device configured such that each of a pair of infrared radiation units can output infrared rays that three-dimensionally scan an installation space.

7 Claims, 8 Drawing Sheets

(51) Int. Cl.
  *B33Y 50/02* (2015.01)
  *G06F 3/04815* (2022.01)
  *G09B 23/36* (2006.01)
(58) Field of Classification Search
  CPC ..... B33Y 50/02; B33Y 80/00; G06F 3/04815; G06F 3/01; G06F 3/0346
  See application file for complete search history.

(56) References Cited

U.S. PATENT DOCUMENTS

| | | | |
|---|---|---|---|
| 2015/0355805 A1* | 12/2015 | Chandler | G06F 3/0482 |
| 2016/0191887 A1* | 6/2016 | Casas | G02B 27/0172 |
| | | | 348/47 |
| 2017/0368413 A1* | 12/2017 | Shavit | A63B 24/0075 |

FOREIGN PATENT DOCUMENTS

| | | | | |
|---|---|---|---|---|
| CN | 107452266 A | * | 12/2017 | G09B 23/34 |
| CN | 108024693 A | * | 5/2018 | A61B 17/00234 |
| CN | 108346175 A | * | 7/2018 | G06T 17/00 |
| JP | 2004167276 A | * | 6/2004 | |
| JP | 2006305360 A | * | 11/2006 | A61B 8/12 |
| JP | 4017877 B2 | * | 12/2007 | A61B 1/0005 |
| JP | 2014215563 A | | 11/2014 | |
| JP | 2018010034 A | | 1/2018 | |
| KR | 1020110029313 A | | 3/2011 | |
| KR | 20140020871 A | * | 2/2014 | G06F 3/017 |

OTHER PUBLICATIONS

Elecom, "JC-VRR01 series, Bluetooth (R) remote control for VR", https://www.elecom.co.jp/products/JC-VRR01BK.html, published date of Jul. 26, 2016.
Elecom, "JC-VRP01 series, VR gamepad", https://www.elecom.co.jp/products/JC-VRP01BK.html, published date of Oct. 17, 2017.
Mikio Kitajima, "Arms are hacked! Tactile game controller with a dangerous experience [UnlimitedHand]", https://ascii.jp/elem/000/001/164/1164500, published date of May 20, 2016.
Atupon, "Reproduce "tension" and pressure on fingers with gloves for VR and artificial tendons", https://www.moguravr.com/contact-ci-maestro, published date of Jan. 23, 2018.
"Students have developed a bag that makes the feeling of touching in VR feel like an actual person", https://shiropen.com/2015/04/25/7538, published date of Apr. 25, 2015.

* cited by examiner

-- Prior Art --

-- Prior Art --

-- Prior Art --

-- Prior Art --

-- Prior Art --

-- Prior Art --

CONTROLLER, METHOD FOR MANUFACTURING CONTROLLER, SIMULATED EXPERIENCE SYSTEM, AND SIMULATED EXPERIENCE METHOD

TECHNICAL FIELD

The present disclosure relates to a controller, a controller manufacturing method, a simulated experience system, and a simulated experience method. More specifically, the present disclosure relates to a simulated experience that a user can obtain by manipulating a target image modeled on an object displayed in an image display device, while touching a main part having the same or substantially same shape as an object for education or the like, such that the user's visual and tactile senses are simulated, thereby providing an intuitive and highly-immersive simulated experience.

BACKGROUND ART

Research and commercialization regarding a system or the like configured for a simulated experience in a virtual reality space (hereinafter, referred to as "a VR system or the like") have been proposed since 1960s, but widespread use by general public has been delayed. This is because a computer having a high degree of image processing capability is indispensable for generating images or pictures constituting a VR space, and such high-performance computers are large-sized or expensive and thus are out of reach not only of domestic consumers, but also of educational institutes, research institutes, or companies with insufficient budgets.

However, recent improvement of technological levels has been followed by widespread use of less expensive and small-sized computers, the performances of which have been improved such that they can constitute VR systems or the like in connection with normal terminals such as domestic computers or game consoles. Such a situation change has gradually made it easier to introduce a VR system or the like at a place for school education or the like, and a higher level of learning is expected through a simulated experience obtained by introducing such a VR system or the like.

However, various types of controllers (described below) have been proposed as devices (hereinafter, referred to as controllers) for manipulating images which are generated inside the device main part of a VR system or inside a VR space, and which are manipulated by the user (images displayed as such contents will hereinafter be referred to as "target images"), and are illustrated in FIGS. 7A-F.

NON-PATENT DOCUMENTS

Non-patent document 1: ELECOM top product information VR-related product VR input/output device VR mouse (M-VRF01BK) Internet <URL:http://www2.elecom.co.jp/products/M-VRF01BK.html>

Non-patent document 1: ELECOM top product information VR-related product VR input/output device VR Bluetooth™ remote controller (JC-VRR01BK) Internet <URL:http://www2.elecom.co.jp/products/JC-VRR01BK.html>

Non-patent document 3: ELECOM top product information VR-related product VR input/output device VR game pad (JC-VRP01BK) Internet <URL:http://www2.elecom.co.jp/products/JC-VRP01BK.html>

Non-patent document 4: Your arms are hacked! Tactile game controller dangerous to experience "UnmimitedHand" Internet <URL:http://ascii.jp/elem/000/001/164/1164500/>

Non-patent document 5: MoguraVR Gloves for VR, artificial tendons "pull" fingers or reproduce pressure Internet URL:https://www.moguravr.com/contact-ci-maestro/

Non-patent document 6: According to Seamless Virtual Reality News, a student has invented gloves that make actual hands feel touches made inside VR! Internet <URL:https://shiropen.com/2015/04/25/7538>

Technical Problem

Meanwhile, there is ongoing development of VR systems or the like, but VR systems or the like at the current phase are mainly directed to giving immersion by stimulating visual and tactile senses. When such VR systems or the like are used to enjoy passive contents, such as movies, controllers described above in Non-patent documents 1-3 pose no particular problems. However, the following problems occur in the case of active contents (for example, when users manipulate target images).

That is, currently used controllers are mainly classified into a mouse type 91 (non-patent document 1) illustrated in FIG. 7A, a joystick type 92 (non-patent document 2) illustrated in FIG. 7B, and a game pad 93 (non-patent document 3) illustrated in FIG. 7C. When a user uses one of these conventional controllers, he/she may notice a discrepancy resulting from a difference in shape between the touched controller (tactile) and the viewed target image (visual). In addition, when manipulating the target image, the user manipulates a point appearing on the screen according to the target image. As a result, the user does not feel immersed because the manipulation is not sufficiently intuitive.

In an attempt to solve the problem of the absence of immersion or the discrepancy, research has been conducted to endow a virtual tactile sense by introducing a tactile element into a VR system or the like. Examples thereof include a functional electric stimulus-type device 94 (non-patent document 4) which gives the user electric stimuli so as to control fingers, illustrated in FIG. 7D, a functional device 95 (non-patent document 4) for giving electric and vibrational stimuli through gloves, illustrated in FIG. 7E, and a device 96 (non-patent document 6) for giving air-pressure stimuli through gloves, illustrated in FIG. 7F. It has been proposed to endow, through such stimuli, tactile senses such that the user who wears the same feels like touching the target image (hereinafter, referred to as a "tactile sense endowing controller").

However, at the time of filing of the present application, tactile sense endowing controllers having a high degree of precision of tactile sense reproduction not only require complicated operating systems or algorithms, but also become large-scale devices including peripheral devices, thereby increasing the manufacturing costs or product prices. Moreover, tactile sense endowing controllers having a high degree of precision of tactile sense are not only difficult to mount, but also are heavy. In addition, cords or hoses connected thereto limit movements, and the resulting burdens on users degrade the manipulation or prevent them from being immersed.

The present disclosure has been in view of the above-mentioned problems, and it is an aspect of the present disclosure to provide a controller, a controller manufacturing method, a simulated experience system, and a simulated experience method, wherein a user can manipulate a target image modeled on an object displayed in an image display device, while touching a main part having the same or substantially same shape as an object for education or the like, such that the user's visual and tactile senses are simulated, thereby obtaining an intuitive and highly-immersive simulated experience.

SUMMARY OF THE INVENTION

In accordance with an aspect of the present disclosure, a controller includes: a main part formed to have a shape identical or substantially identical to a shape of an object for education, research, or training; and a signal transmitter installed on the main part and configured to transmit a signal for synchronizing an operation of the main part and a movement of a target image which is displayed in an external image display device and is modeled on the object.

The controller includes a main part having a shape identical or substantially identical to the shape of an object for education, research, or training (hereinafter, also referred to as "education or the like" as a whole) such that a user touching the controller can receive a tactile stimulus as if directly touching the object for education or the like, and can also recognize the shape or size thereof.

Moreover, the controller includes a signal transmitter installed on the main part such that a target image modeled on the object is displayed in external image display device, and can transmit a signal for synchronizing an operation of the main part and a movement of the target image such that the displayed target image moves in accordance with the operation of the main part.

As such, the controller according to the present disclosure enables the user to recognize the shape or size of the object through the tactile feeling when touching the main part, and the signal transmitter may transmit the above-mentioned signal out of the device.

The transmitted signal is then received by an external device having an image processing function, and the external device performs processing of synchronizing (linking) the target image with main part position information. As a result of this synchronization processing, the movement applied to the main part by the user matches with the movement of the displayed target image, and it becomes possible to observe the target image from various angles by rotating the controller, for example.

That is, the controller according to the present disclosure links the movement (visual) of the target image displayed on the image display device and the movement (tactile) of the controller that is being touched, thereby making it possible to manipulate the target image through a feeling as if directly manipulating the object. As a result, when used in a simulated experience system (for example, a VR system), the same provides an intuitive and highly-immersive simulated experience, thereby improving the merit of education or the like.

When the object is a specific animal's organ, the main part modeled on the object may have the shape of the specific animal's organ.

The controller according to the present disclosure enables the user, who is holding the main part modeled on the shape of an animal organ by hand, to recognize the shape or size of the organ through the tactile sense, and to observe the same through the visual sense from various angles by manipulating (for example, rotating) the main part.

That is, the controller according to the present disclosure links the movement (visual) of image of the animal organ displayed on the image display device and the movement of the controller that is being touched, thereby making it possible to manipulate the image of the animal organ through a feeling as if directly moving the animal organ.

Furthermore, by touching the controller, the user can recognize the shape of the animal organ through the tactile sense. As a result, when used in a simulated experience system (for example, a VR system), the same provides an intuitive and highly-immersive simulated experience, thereby improving the merit of education or the like.

When the main part is formed on the basis of data regarding the shape of an animal organ or a portion thereof, which is obtained by inspecting an animal, the shape of the main part may be made to match with that of the specific animal organ or the like, from which the data has been collected through inspection.

By forming the main part on the basis of "data regarding the shape of an animal or a portion thereof" obtained from such inspections, the user, who is touching the controller, may receive a tactile stimulus as if touching a specific animal organ, not an organ having a normal shape or size, and may also recognize the shape or size thereof.

The controller according to the present disclosure enables the practitioner to observe in advance the situation of the affected area based on the shape or status of the target organ or the like of the patient, for example, thereby improving the surgery success ratio through simulated verification of the target area or simulated surgery training.

When at least a surface portion of the main part is made of a flexible resin material, the difference in texture from the object on which the same is modeled, and the resulting tactile stimulus, which is close to the actual object, enables observation at a higher level of precision or improved learning result. Although "at least a surface portion" is mentioned in view of the texture, this is not limiting in any manner, and a part of the interior of the main part or the entire main part may be made of a flexible resin material.

In accordance with another aspect of the present disclosure, a method for manufacturing a controller includes: a main part formation operation of forming a main part having a shape identical or substantially identical to a shape of an object for education, research, or training; and a signal transmitter installation operation of installing a signal transmitter on the main part formed in the main part formation operation, the signal transmitter being configured to transmit a signal for synchronizing an operation of the main part and a movement of a target image, which is displayed in an external image display device and is modeled on the object.

By including the main part formation operation, the method for manufacturing a controller according to the present disclosure makes it possible to obtain a main part having a shape identical or substantially identical to the shape of an object for education or the like.

By including the signal transmitter installation operation, the method for manufacturing a controller according to the present disclosure may provide a signal transmitter in the main part, the signal transmitter being capable of transmitting a signal for synchronizing an operation of the main part and a movement of a target image, which is displayed in an external image display device and is modeled on the object, such that the displayed target image moves in accordance with the operation (actual movement) of the main part.

The controller manufactured according to the present disclosure links the movement (visual) of the target image displayed on the image display device and the movement (tactile) of the controller that is being touched, thereby making it possible to manipulate the target image through a feeling as if directly manipulating the object. As a result, when used in a simulated experience system (for example, a VR system), the same provides an intuitive and highly-immersive simulated experience, thereby improving the merit of education or the like.

If the main part formation operation is performed by a 3D printer, no molds or the like are necessary. As a result, even a one-of-a-kind or small-lot controller can be quickly manufactured simply by inputting data. In addition, since no molds need to be manufactured, the main part can be obtained relatively inexpensively. In particular, if the object is an animal organ acquired through inspection, only one item is manufactured in most cases. Therefore, the main part is preferably formed by a 3D printer, considering the quick manufacturing or the low cost.

In accordance with another aspect of the present disclosure, a simulated experience system includes: an image display device; a controller including a main part formed to have a shape identical or substantially identical to a shape of an object for education, research, or training, and a signal transmitter installed on the main part and configured to transmit a signal for synchronizing an operation of the main part and a movement of a target image, which is displayed in the image display device and is modeled on the object; and a computer including a signal receiver connected to the controller and the image display device and configured to receive a signal transmitted from the signal transmitter, a calculation part connected to the signal receiver and configured to analyze, based on the received signal, an operation of the main part and calculate operation data, an image generator configured to generate the target image, based on data on a shape of the object, a synchronization processor configured to synchronize the operation data calculated by the calculation part such that the target image generated by the image generator moves in accordance with an operation of the main part, and an image output part configured to output the target image processed by the synchronization processor to the image display device.

The simulated experience system according to the present disclosure includes an image display device and thus can display a target image generated by the computer, and can also manipulate the displayed target image by using the controller.

The controller of the simulated experience system according to the present disclosure has a main part having the same or substantially same shape as that of the object for education or the like such that the user, who is touching the controller, may receive a tactile stimulus as if directly touching the object for education or the like, and may also recognize the shape or size thereof. In addition, by including the signal transmitter, the controller may transmit a signal for synchronizing an operation of the main part and a movement of a target image, which is displayed in the image display device and is modeled on the object, such that the target image moves in accordance with the operation (actual movement) of the main part.

The computer of the simulated experience system according to the present disclosure is connected to a controller and an image display device and includes a signal receiver, a calculation part, an image generator, a synchronization processor, and an image output part, thereby exhibiting the following operations:

(1) The computer has a signal receiver and thus can receive a signal from the controller.
(2) The computer has a calculation part and thus can analyze, based on the signal received by the signal receiver, an operation of the main part and calculate operation data.
(3) The computer has an image generator and thus can generate a target image, based on data on the object.
(4) The computer has a synchronization processor and thus can synchronize the operation data calculated by the calculation part such that the target image generated by the image generator moves in accordance with the operation of the main part.
(5) The computer has an image output part and thus can output the target image processed by the synchronization processor to the image display device.

As such, the simulated experience system according to the present disclosure makes it possible to recognize the shape or size of the object through a tactile feeling when touching the main part of the controller, and the signal transmitter can transmit the signal to the outside of the device. The transmitted signal is received by the computer, and the computer synchronizes (links) the target image with the main part position information. As a result of this synchronization processing, the movement applied to the main part matches with the movement of the displayed target image, and it becomes possible to observe the target image from various angles by rotating the controller, for example.

That is, the simulated experience system according to the present disclosure links the movement (visual) of the target image displayed on the image display device and the movement (tactile) of the controller that is being touched, thereby making it possible to manipulate the target image through a feeling as if directly manipulating the object. As a result, when used in a simulated experience system, the same provides an intuitive and highly-immersive simulated experience, thereby improving the merit of education or the like.

The manner of connection between each of the controller and the image display device and the computer includes any case of wireless and wired connections. One connection may be wireless, and the other may be wired (for example, the computer and the controller are connected in a wireless manner, and the computer and the image display device are connected in a wired manner, or vice versa). A signal received through connection with the "controller" may be input to the computer, and an image generated through connection with the "image display device" may be output from the computer.

The computer may further include a storage part configured to store additional data related to an organ of an animal or a portion thereof, which can be synthesized with a generated target image, an additional image generator configured to generate an additional image on the basis of on the additional data stored in the storage part, and an image synthesizer configured to synthesize the additional image, generated by the additional image generator, with the generated target image. In this case, the additional image generated on the basis of on the additional data may be synthesized with the target image.

When the target image is a human liver, for example, a blood vessel running inside the liver is synthesized as an additional image such that, if the liver image (target image) is rotated or the like by the controller, the blood vessel is viewed at different angles under synchronization with the movement. Such observation improves the merit of learning, and may help simulated verification or the surgery area or simulated surgery training.

By including a storage part, the computer may store additional data regarding an animal organ or a portion thereof, which can be synthesized with the generated target image. The "storage part" refers to a part capable of inputting, storing, and outputting the data, such as a storage or a memory.

By including an additional image generator, the computer may generate an additional image on the basis of on the additional data stored in the storage part. By including an image synthesizer, the computer may synthesize the additional image, generated by the additional image generator, with the generated target image.

For now, it costs a large amount of money to manufacture an actual-sized stereoscopic model of an organ (target organ or the like) which has a transparent outer portion, and which has reproduced blood vessels and the like inside the organ (hereinafter, referred to as a "skeleton model").

However, according to the present disclosure, an additional image of a blood vessel or the like can be superimposed and synthesized (projected) onto the organ (target organ or the like) on the image display device. Compared with the case of manufacturing an actual skeleton model, it is possible to easily and quickly obtain a model (virtual reality image) that can be visually observed at a low cost. Furthermore, the organ can also be observed through the texture of the main part that reproduces the shape or the like or the target organ, thereby having a simulated experience of organ observation through visual and tactile senses.

In accordance with another aspect of the present disclosure, a simulated experience method according to the present disclosure uses: an image display device; a controller including a main part formed to have a shape identical or substantially identical to a shape of an object for education, research, or training, and a signal transmitter installed on the main part and configured to transmit a signal for synchronizing an operation of the main part and a movement of a target image, which is displayed in the image display device and is modeled on the object; and a computer having a function of receiving the signal, a calculation function of analyzing, based on the received signal, an operation of the main part and calculating operation data, an image generation function of generating the target image, based on data on a shape of the object, a synchronization function of synchronizing the calculated operation data such that the generated target image moves in accordance with the operation of the main part, and an image output part configured to output the synchronized target image to the image display device, wherein a user manipulates the target image by touching the controller while observing the target image displayed in the image display device.

The simulated experience method according to the present disclosure uses the image display device, the controller, and the computer such that the user can manipulate the target image through the controller while visually checking the target image displayed in the image display device. The user can recognize the shape or size of the object through the tactile feeling when touching the main part of the controller.

That is, the simulated experience method according to the present disclosure links the movement (visual) of the target image displayed on the image display device and the movement (tactile) of the controller that is being touched, thereby making it possible to manipulate the target image through a feeling as if directly manipulating the object. As a result, when used in a simulated experience system, the same provides an intuitive and highly-immersive simulated experience, thereby improving the merit of education or the like.

Advantageous Effects

The present disclosure may provide a controller, a controller manufacturing method, a simulated experience system, and a simulated experience method, wherein a user can manipulate a target image modeled on an object displayed in an image display device, while touching a main part having the same or substantially same shape as an object for education or the like, such that the user's visual and tactile senses are simulated, thereby obtaining an intuitive and highly-immersive simulated experience.

BRIEF DESCRIPTION OF THE DRAWINGS

FIG. 6A illustrates an image of the liver and an image of blood vessels in the liver before the images are synthesized with each other, and FIG. 6B illustrates an image obtained by synthesizing the images illustrated in FIG. 6A with each other;

FIG. 7A is a perspective view of the controller in non-patent document 1, FIG. 7B is a perspective view of the controller in non-patent document 2, and FIG. 7C is a perspective view of the controller in non-patent document 3; FIG. 7D is a perspective view of the controller in non-patent document 4, FIG. 7E is a perspective view of the controller in non-patent document 5, and FIG. 7F is a perspective view of the controller in non-patent document 6.

DETAILED DESCRIPTION OF EMBODIMENTS OF THE INVENTION

Figure 1:
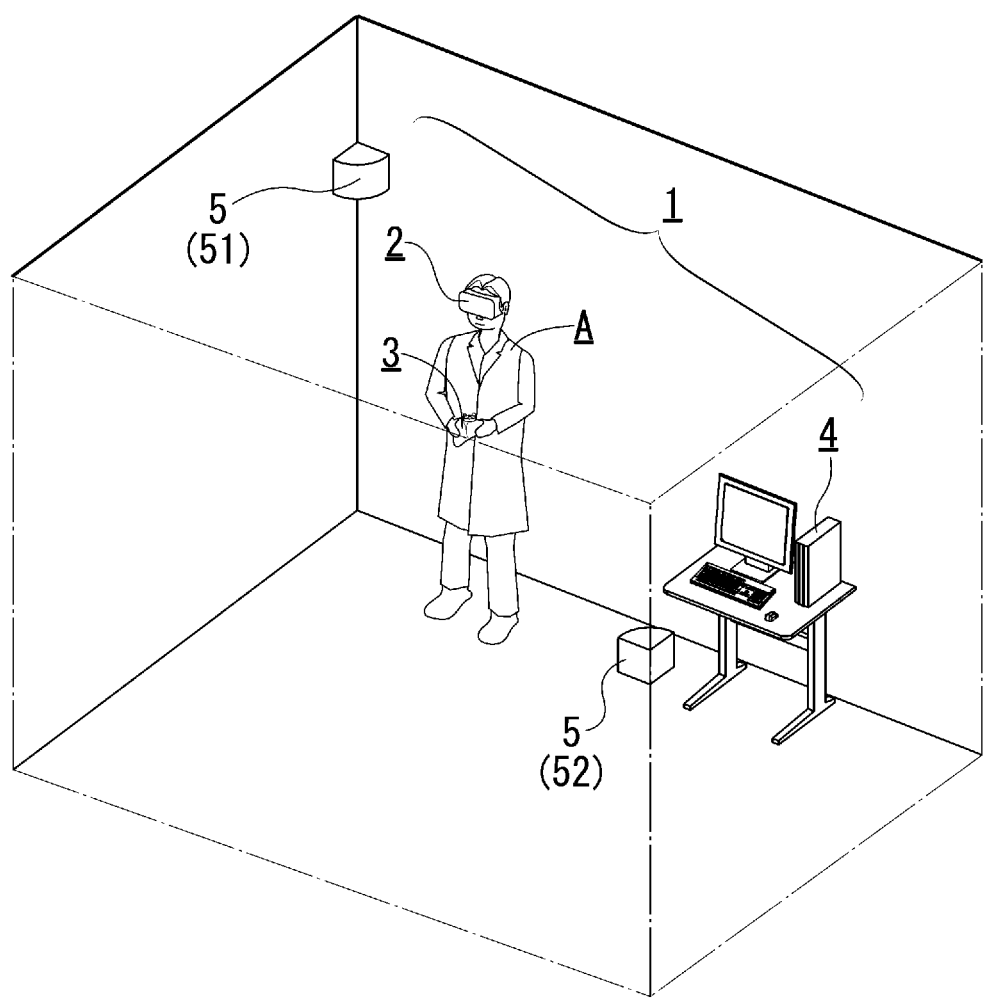
FIG. 1 is a diagram of a simulated experience system according to the present disclosure.

Embodiments of the present disclosure will be more specifically described with reference to FIGS. 1 to 6. Hereinafter, the description will be made of [a simulated experience system], [a simulated experience method], and [a method for manufacturing a controller] in order. Further, reference numerals in each drawing are assigned to the extent required to reduce complexity and make understanding easy. In the case of multiple equivalent elements to which the same reference numerals are added, reference numerals may be assigned to only some thereof.

Furthermore, the term "object for education, research, or training" used herein, hereinabove, and hereinafter includes, for example, a human organ to be learned in connection with professional medical education, a sculpture used during an art lesson, a human organ to be studied for a new surgery, an excavated object serving as an archaeological research object, a new mechanical part under development/research, a mechanical part serving as an object of proficiency training for assembly works, an artifact serving as an archaeological restoration object, a lesioned human organ serving as a target of simulated training before a surgery, and other objects. In addition, the term "education" used herein, hereinabove, and hereinafter includes description or explanation (for example, an act of explaining a subject's affected area, surgery area, or surgical method in the medical field).

The term "formed in the same shape" used herein, hereinabove, and hereinafter means having the same shape and size as those of the object for education or the like. In addition, term "formed in the substantially same shape" used herein, hereinabove, and hereinafter encompasses not only a case of having substantially the same shape and size as those of the object for education or the like, but also a case of having an enlarged or reduced size compared with the actual size of the object or a case in which only a part of the actual object (for example, one of a pair of lungs or kidneys, or a specific area (upper or lower portion) of a lung) is formed.

The term "image display device" used herein, hereinabove, and hereinafter may refer to various kinds of monitors made of liquid crystals or the like, a television monitor, a head-mounted display (HMD), or a stereoscopic image display device. In addition, the term "target image" used herein, hereinabove, and hereinafter may refer to an image which is displayed in connection with a virtual reality image, an extended reality image, or a mixed reality, for example, and which can be manipulated inside the displayed image.

The term "signal" used herein, hereinabove, and hereinafter refers to a signal indicating a displacement resulting from a movement of the main part, in particular, and is also used to denote a signal indicating a stationary state of the main part. The "signal" also includes a signal resulting from a reflective marker (obtained by applying a retroreflective material) which reflects infrared rays or the like from an external infrared projector so as to indicate a marker, a signal resulting from a self-luminous marker, and signals used to transmit measurement values by various sensors necessary to perform tracking (reading positions of a gyro sensor, an acceleration sensor, and the like).

The term "specific animal" used herein, hereinabove, and hereinafter may be selected from various kinds of animals (for example, a test animal serving as an object for education or the like), including humans. The term "organ" used herein, hereinabove, and hereinafter is used to encompass various organs such as a nervous system, a sensory system, a motion system, a skeletal system, a digestive system, a respiratory system, a circulatory system, an excretory system, a reproductive system, and an endocrine system.

The term "inspection" used herein, hereinabove, and hereinafter includes various kinds of inspection by which animal organs can be inspected, such as computed tomography (CT), magnetic resonance imaging (MRI), and Roentgen inspection. In addition, the animal to be inspected may be, for example, a specific animal such as a mouse model to which human cancer cells have been transplanted, and which thus has cancer, and also includes a human as a treatment object.

The term "flexible resin material" used herein, hereinabove, and hereinafter may include silicone rubber, super-flexible urethane resin, thermoplastic elastomer, and the like. In particular, when an animal organ (for example, internal organ or blood vessel) is formed as the main part by using silicone rubber, a texture similar to the actual object can be reproduced.

Simulated Experience System 1

Reference is made to FIG. 1. A simulated experience system 1 includes an image display device 2, a controller 3, a computer 4, and an infrared emission device 5. Each of the elements will be described in detail below. Further, in the description below, a human liver is selected as the above-described "object for education or the like".

Image Display Device 2

An image display device 2 employs an HMD (see FIG. 1). The image display device 2 at least includes: an acceleration sensor (not shown) configured to mechanically sense movement in the three-dimensional direction to detect movement in each axial direction; a gyro sensor (not shown) configured to detect an angular speed; an infrared reception sensor (not shown); a calculation device (not shown) configured to convert a measurement value detected by each sensor into a signal; a wireless transmitter (not shown); and a speaker part (not shown). The image display device 2 has a function of converting position information based on an operation of a mounted head part into a signal in cooperation with the acceleration sensor, etc. and transmitting the signal.

Further, the image display device 2 includes a receiver (not shown) configured to receive image information generated by the computer 4, and has a function of displaying an image generated by the computer 4 to a user (A).

Controller 3

Figure 2:
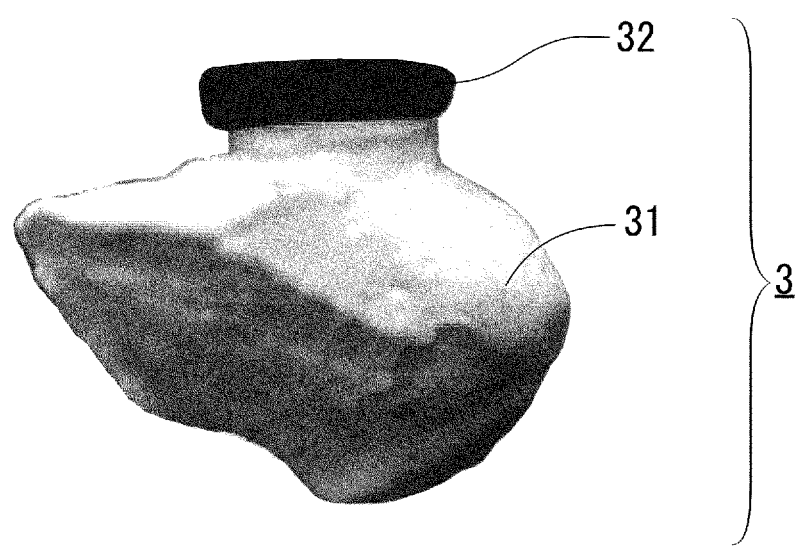
FIG. 2 is a front view of a controller used in the simulated experience system illustrated in FIG. 1.

The controller 3 includes a main part 31 and a signal transmitter 32 (see FIG. 2)

The main part 31 has an exterior appearance modeled on a human liver in an actual size, and includes: a hollow base portion (not shown) which is slightly smaller than the main part 31 and is made of plastic; and a surface portion (no reference numeral) which is made of a flexible urethane resin with which the surface of the base portion is coated. Further, the flexible urethane resin corresponds to the above-described "flexible resin material".

The main part 31 maintains a fixed form by having the above-described base portion, but the surface portion made of a flexible urethane resin reproduces a texture close to that of an actual object, and thus can increase immersion during use by a user. Further, the base portion is hollow and thus light in weight, and less material is needed so that manufacturing costs can be reduced.

The signal transmitter 32 is installed at a predetermined portion of the main part 31 (the top of the main part 31 in FIG. 2). The signal transmitter 32 is a small unit which at least contains, in a case (no reference numeral) thereof, an acceleration sensor (not shown) configured to mechanically sense movement in the three-dimensional direction to detect movement in each axial direction, a gyro sensor (not shown) configured to detect an angular speed, an infrared reception sensor (not shown), a calculation device (not shown) configured to convert a measurement value detected by each sensor into a signal, and a wireless transmitter (not shown).

Further, a signal, into which a measurement value detected by each of the sensors described above has been converted, corresponds to the above-described "signal for synchronizing a real operation of the main part with movement of a target image modeled on an object, displayed in an external image display device, such that the target image moves in accordance with the real operation of the main part".

In the present embodiment, the image display device 2 is an HMD, but is not limited thereto. For example, the image display device 2 may also be various types of monitors such as a crystal including a screen of a portable terminal, a television monitor, or a three-dimensional image display device, or may be a device capable of dynamically displaying a target image. In addition, in terms of immersion, it is better to use an HMD configured to visually block outside scenery, but in the case of giving a class or explanation to multiple people, when HMDs corresponding to the number of people are difficult to prepare, it is desirable to use large-screen monitor or three-dimensional image display device.

In the present embodiment, the structure of the main part 31 is as described above, but is not limited thereto. For example, the main part 31 may be formed of the same material, and may have a structure having three or more layers. In addition, when the main part is formed to be solid, weight or cost is increased, and thus it is desirable that the main part is hollow. Further, when the entire main part is formed of a flexible material such as a flexible urethane resin, the main part is easily deformed by a load or self-weight, and thus cannot maintain the shape thereof. Therefore, it is desirable to dispose a member such as a frame in the main part.

In the present embodiment, the surface portion of the main part 31 is coated with a flexible urethane resin, but is not limited thereto and may be changed depending on an object for education or the like. For example, for the purpose of research and development on metal components or assembly technique training, the surface portion may be formed to be flat and reproduce a metal texture. For the purpose of learning or studying unearthed stone tools, the same corrugation or roughness as that of an actual object is formed on the surface portion, thereby reproducing a stone texture. As a result, immersion may be increased during use by a user.

Computer 4

Reference is made to FIGS. 3 to 6. A computer 4 is wirelessly connected to the image display device 2 and the controller 3. The computer 4 includes a signal receiver 41, a calculation part 42, an image generator 43, a synchronization processor 44, an image output part 45, a storage part 46, an additional image generator 47, and an image synthesizer 48 (see FIG. 4).

The signal receiver 41 has a function of receiving signals transmitted from the image display device 2 and the controller 3. Further, the calculation part 42 has a function of analyzing, based on the signals received by the signal receiver 41, the real operation of the main part 31 and calculating operation data.

Figure 3:
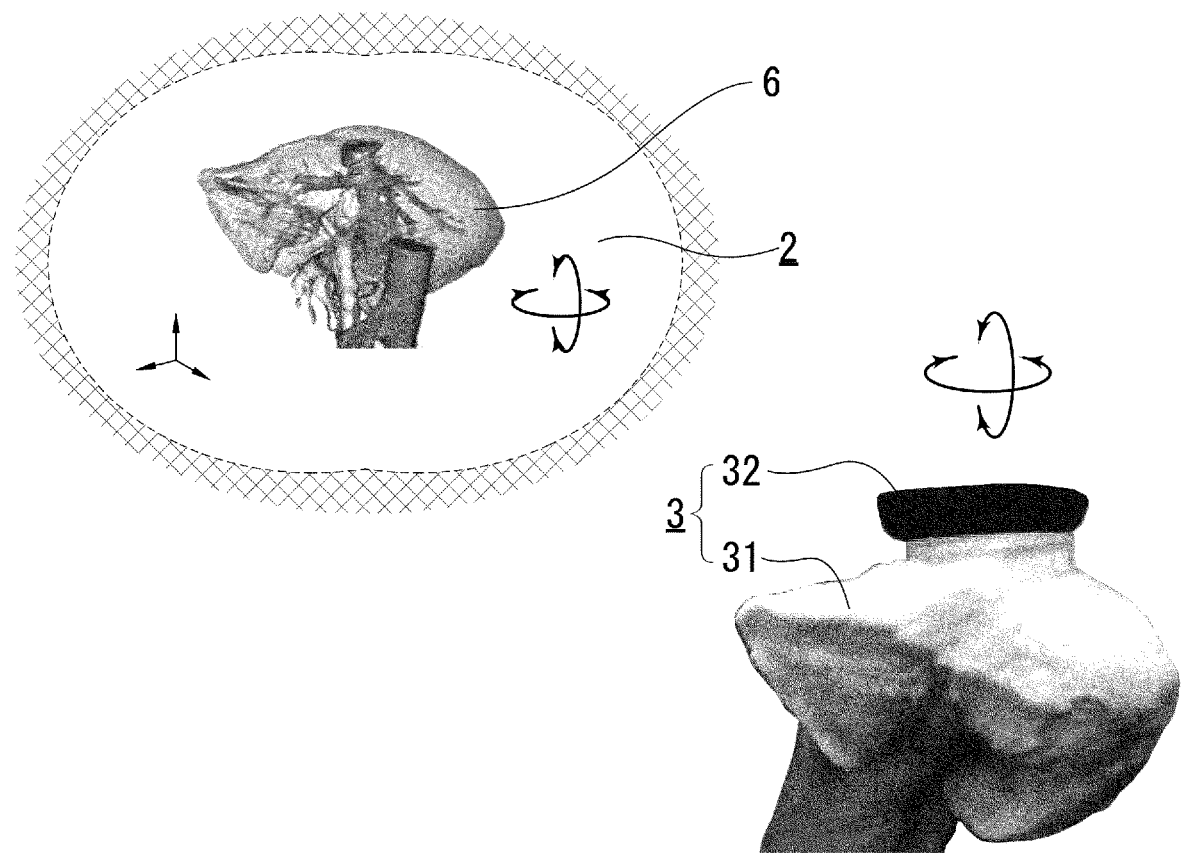
FIG. 3 is a view for describing a correlation between an operation of a controller and movement of an image displayed in an image display device while the simulated experience system illustrated in FIG. 1 is used.
Figure 4:
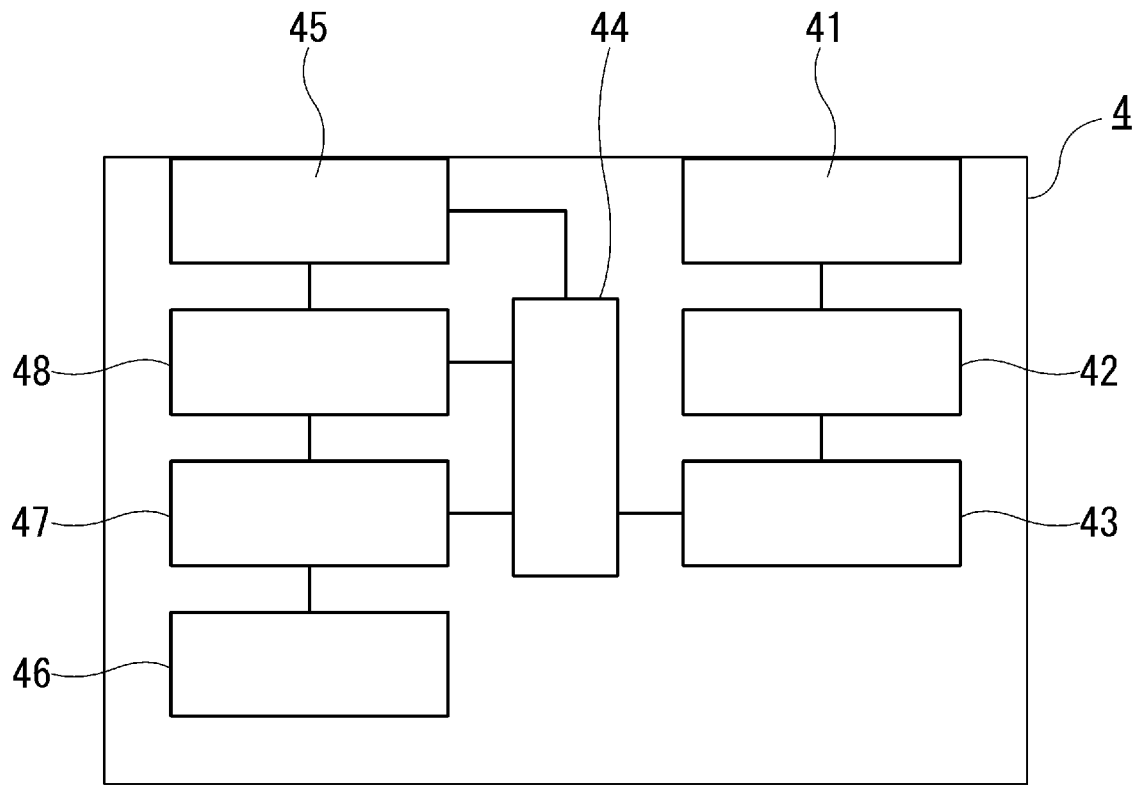
FIG. 4 is a diagram showing the configuration of a computer used in the simulated experience system illustrated in FIG. 1.
Figure 5:
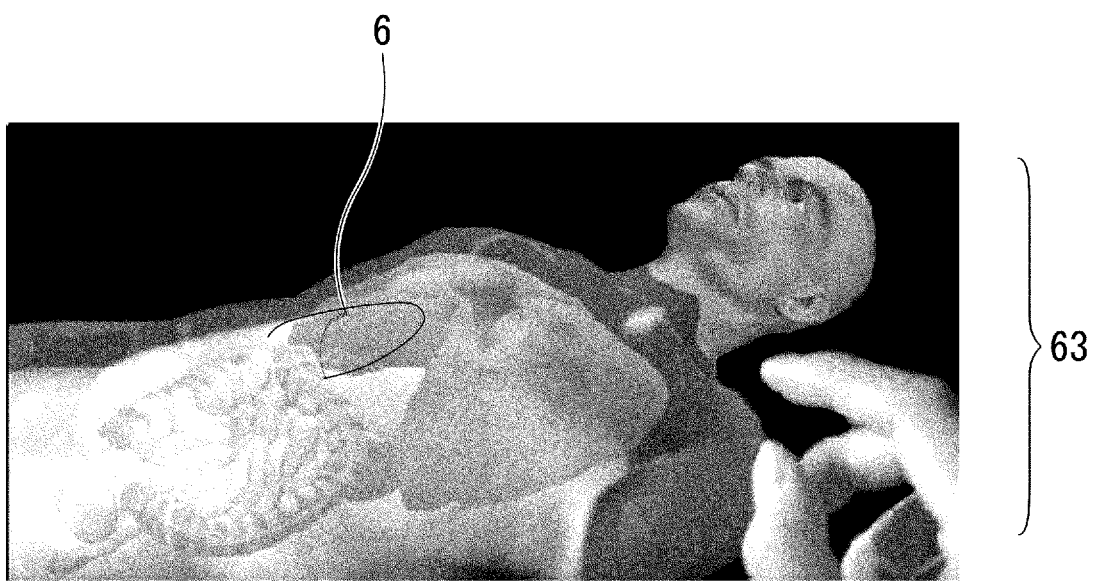
FIG. 5 is a view for describing an example of another image displayed in the simulated experience system illustrated in FIG. 1.

The image generator 43 has a function of generating a liver image 6 (see FIG. 3. The liver image 6 corresponds to the above-described "target image") based on data, such as dimensions of an actual liver (which corresponds to the above-described "object"), acquired from the outside. Further, the image generator 43 has a function of generating, based on the data acquired from the outside, a background image 63 (see FIG. 5) such as the outline of a human body, etc. used when showing the position of the liver in the human body.

The synchronization processor 44 has a function of synchronizing the liver image 6 generated by the image generator 43 and data on an operation of the main part 31 such that the liver image 6 moves in accordance with a real operation of the main part 31. Further, the synchronization processor 44 has a function of synchronizing the background image 63 generated by the image generator 43 with a real operation of the image display device 2 such that the background image 63 moves in accordance with the real operation of the image display device 2 (in a visual point direction).

The image output part 45 has a function of outputting image information of a liver or a background, processed by the synchronization processor 44, to the image display device 2.

The storage part 46 has a function of storing data (corresponding to the above-described "additional data"), such as dimensions for generating an image of blood vessels in the liver, acquired from the outside.

Figure 6A:
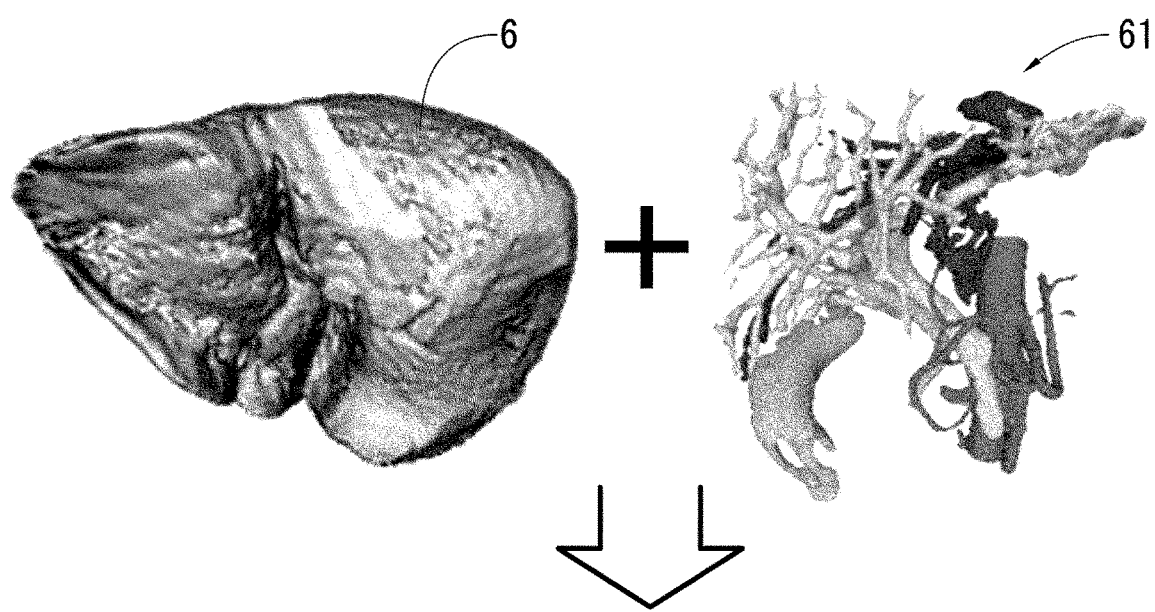
FIGS. 6A and 6B illustrate examples of another image displayed in the simulated experience system illustrated in FIG. 1.

On the basis of the data, such as the dimensions for generating the image of blood vessels in the liver (hereinafter, referred to as a "liver blood-vessel image"), stored in the storage part 46, the additional image generator 47 has a function of generating a liver blood-vessel image 61 (see FIG. 6A).

Figure 6B:
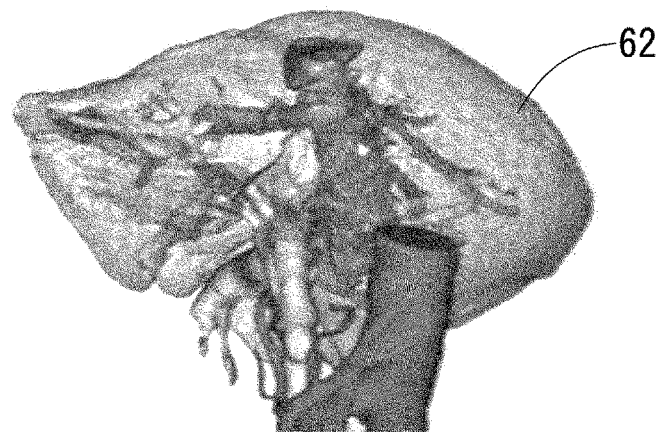
Figure 7A:
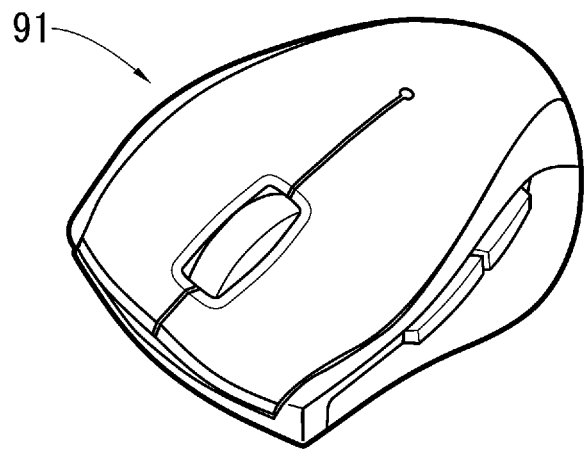
FIGS. 7A to 7C illustrate a prior art, particularly.
Figure 7B:
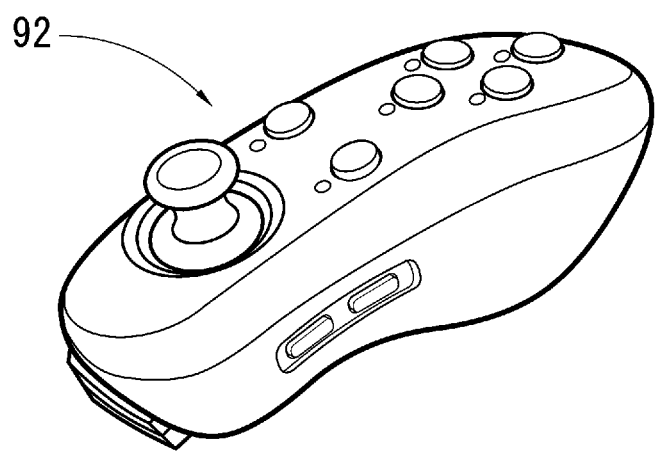
Figure 7C:
Figure 7D:
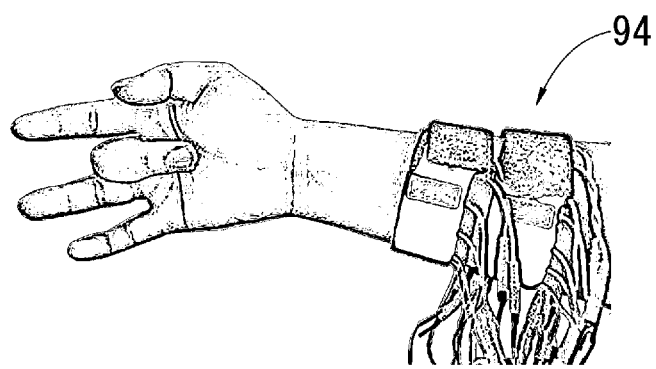
FIGS. 7D to 7F illustrate a prior art, particularly.
Figure 7E:
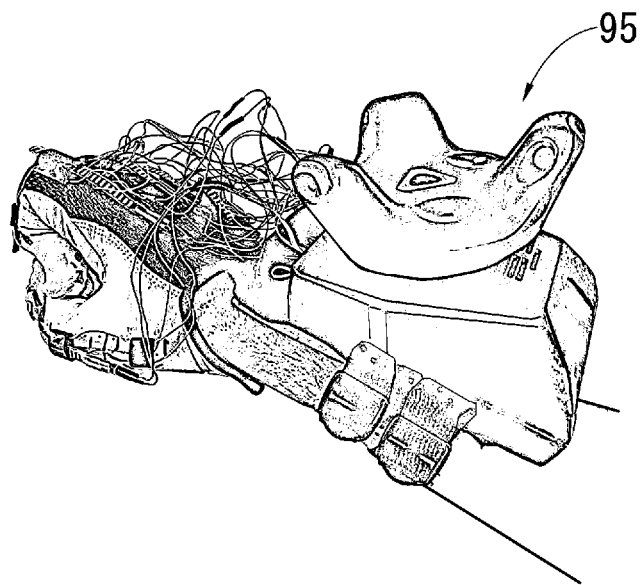
Figure 7F:
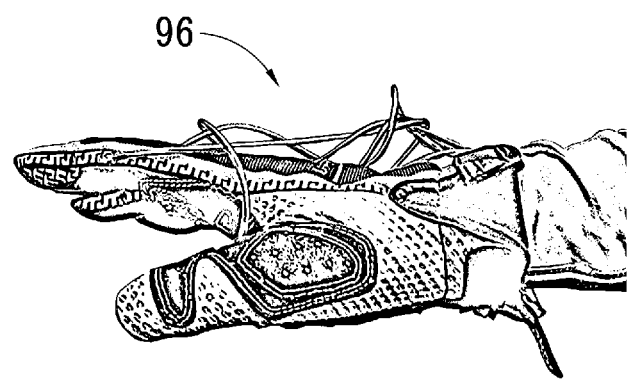

The image synthesizer 48 has a function of synthesizing the liver blood-vessel image 61 generated by the additional image generator 47 with the liver image 6 generated by the image generator 43 (see FIG. 6B). Hereinafter, the synthesized image is referred to as a "synthesized liver image 62".

Infrared Emission Device 5

An infrared emission device 5 includes a pair of infrared emitters 51 and 52 (see FIG. 1). The infrared emitters 51 and 52 are configured to be able to emit infrared rays such that a space in which the infrared emitters 51 and 52 are installed is scanned in the three-dimensional direction. The emitted infrared rays are received by the image display device 2 and the controller 3, and position information in the three-dimensional space is calculated at a time of receiving the infrared rays. In addition, in the configuration of the present embodiment, the image display device 2 and the controller 3 need to be used between the infrared emitters 51 and 52.

In the present embodiment, the infrared emission device 5 includes the pair of infrared emitters 51 and 52, but is not limited thereto. For example, if a device is capable of obtaining position information of the image display device 2 and the controller 3 in the three-dimensional direction, the configuration thereof or emission thereby is not particularly limited.

In the present embodiment, the simulated experience system 1 includes the image display device 2, the controller 3, the computer 4, and the infrared emission device 5, but is not limited thereto. For example, when the image display device 2 is a stand-alone type capable of processing images without using the computer 4, one or both of the computer 4 and the infrared emission device 5 may be removed from the simulated experience system 1.

Simulated Experience Method

An operation of the simulated experience system 1 and a simulated experience method will be described with reference to FIGS. 1 to 6.

(1) The simulated experience system 1 is set up. At this time, the image display device 2, the controller 3, and the computer 4 are synchronized. The user (A) wears the image display device 2 on his/her head and holds the controller 3 in his/her hand.

(2) When the user (A) moves his/her head while looking at the liver image 6 displayed in the image display device 2, a signal of position information is transmitted from the image display device 2. The computer 4, which has received the position information, performs image generation and synchronization on the basis of the received signal, and outputs image information to the image display device 2. As a result, an image changing in accordance with the movement of the head of the user (A) is displayed in the image display device 2.

(3) When the user (A) holds the main part 31 of the controller 3 and applies a movement such as rotation to the controller 3 in order to move the liver image 6 displayed in the image display device 2, a signal of position information is transmitted from the signal transmitter 32 of the controller 3. The computer 4, which has received the position information, performs, based on the received signal, image generation and synchronization, and outputs image information to the image display device 2. As a result, the liver image 6 moving in accordance with the movement of the controller 3 by manipulation of the user (A) is displayed in the image display device 2 (see FIG. 3).

(4) Further, when the user (A) makes a selection, the synthesized liver image 62, in which the liver blood-vessel image 61 generated as an additional image by the computer 4 is synthesized with the above-described liver image 6, is displayed, and thus even the traveling of blood vessels can be observed.

(5) When manipulating the controller 3, the user (A) holds the main part 31, which is modeled on the shape of the liver, in his/her hand, and thus can obtain the same tactile feeling as that felt when touching an actual liver.

As described above, the simulated experience system 1 may include the image display device 2, thereby displaying the liver image 6 generated by the computer 4 (also displaying the synthesized liver image 62 depending on a selection of the user (A)).

The simulated experience system 1 includes the controller 3 having the main part 31 modeled on the actual liver, and thus the user (A) touching the controller 3 may experience the same tactile stimulation as if the user (A) really touches the actual liver. Further, the user (A) may also perceive the shape or size of the liver by touching each portion of the main part 31.

In addition, the controller 3 is light due to the above-described structure, and thus serves to obtain an intuitive and highly-immersive simulated experience. Further, higher immersion may be obtained by configuring the controller 3 to have the same or substantially the same weight as the object. For example, in skill training or the like in which a sense of weight of an object is important, a higher learning effect may be expected by the above-described weight configuration.

Thus, according to the simulated experience method performed using the simulated experience system 1, the user (A) may manipulate the liver image 6 through the controller 3 held in his/her hand while looking at and observing the liver image 6 displayed in the image display device 2. At this time, movement (a visual sense) of the liver image 6 displayed in the image display device 2 is linked with movement (a tactile sense) of the controller 3 touched by the user (A), and thus the user (A) may manipulate the liver image 6 in the same sense as if the user (A) holds and moves the actual liver by himself/herself, and can observe the liver image 6 from various angles. As a result, an intuitive and highly-immersive simulated experience may be obtained when the simulated experience system 1 is used.

Further, the image display device 2 has a speaker part, and may thus stimulate an auditory sense in addition to a visual sense as needed. As a result, the simulated experience system 1 may simultaneously stimulate three senses of a visual sense, an auditory sense, and a tactile sense among the human five senses, and may thus obtain higher immersion.

However, like conventional learning, (passively) watching a displayed picture or image gives less stimulus to the brain (sleepiness in class is evidence thereof), and thus even when a highly detailed image or picture is presented, the high learning effect may not be necessarily expected.

However, in the simulated experience system 1, the user (A) manipulates and moves a displayed image by himself/herself and is stimulated at his/her fingertips by touching the controller modeled on the object, whereby it is possible to perform active learning or the like appealing to the human brain function to "form memories" through a visual sense and a tactile sense. That is, the simulated experience method performed using the simulated experience system 1 may be expected to increase the effect of learning or the like.

Method for Manufacturing Controller

A method for manufacturing the controller 3 includes: a main part formation operation of forming, using a 3D printer, the main part 31 having the same shape as a liver which is an object for education or the like; and a signal transmitter installation operation of installing the signal transmitter 32 on the formed main part 31.

According to the manufacturing method, the controller 3 may be manufactured by obtaining the main part 31 modeled on the liver in the main part formation operation and arranging the signal transmitter 32 on the main part 31 in the signal transmitter installation operation.

In addition, the main part formation operation is performed by the 3D printer, and thus does not need a mold and the like. Therefore, (particularly, when a 3D printer is already possessed) the main part may be quickly manufactured by inputting dimension data regarding the liver, and since a mold is not needed, the main part may be procured at a comparatively low cost.

As described above, a simulated experience system which is currently developed has not yet attained reproduction of a tactile feeling (a feeling of hardness, softness, texture, or micro shape) felt when touching a target image in a virtual environment. However, according to the simulated experience system 1 of the present disclosure, a tactile feeling felt when touching a target image in a virtual environment may be reproduced by using the controller 3 which includes the main part 31 formed to have the same or substantially the same shape as an object for education or the like, and thus a highly-immersive simulated experience can be obtained.

Further, according to the simulated experience system 1 of the present disclosure, it is possible to share a simulated experience with a person who is not in a place where an actual object is present. For example, even when only one unearthed article is difficult to lend to the outside, researchers can share data such as dimensions thereof and can make the controller 3 on the basis of the data, and a target image can be generated by the computer 4 and thus the researcher can obtain the same simulated experience. Therefore, it is expected that the researchers can simultaneously perform joint research or can obtain new knowledge.

Likewise, doctors in remote places can share data such as dimensions of the internal organs of patients, which are obtained through CT or the like, thereby easily performing discussion on an optimal surgical procedure method, joint research on a new surgical operation method, or sharing of knowledge about incurable diseases or rare diseases.

Furthermore, even when students or participants are in places remote from a place in which a school, etc. is located, the students or the participants can share an object for education or the like, thereby taking classes or lessons through a simulated experience.

The terms and expressions used in the present specification and the claims are to be interpreted only as illustrative, are never limited, and are not intended to exclude the features described in the present specification and the claims and terms or expressions equivalent to some thereof. Further, it is hardly necessary to say that various modifications are possible within the scope of the technical idea of the present disclosure.

DESCRIPTION OF REFERENCE SIGNS

1: Simulated experience system
2: Image display device
3: Controller
31: Main part
32: Signal transmitter
4: Computer
41: Signal receiver
42: Calculation part
43: Image generator
44: Synchronization processor
45: Image output part
46: Storage part
47: Additional image generator
48: Image synthesizer
5: Infrared emission device
51, 52: Infrared emitters
6: Liver image
61: Liver blood-vessel image
62: Synthesized liver image
63: Background image
91: Mouse type
92: Joystick type
93: Gamepad
94: Functional electric stimulus-type device
95: Functional device for giving electric and vibrational stimuli
96: Device for giving air-pressure stimulus
A: User

The invention claimed is:

1. A controller comprising:
a main part formed to have a shape identical or approximately identical to a shape of an object for education, research, or training; and
a signal transmitter installed on the main part to have an acceleration sensor, a gyro sensor, and an infrared reception sensor,
wherein the signal transmitter is configured to transmit a signal for synchronizing an operation of the main part and a movement of a target image that is displayed in an external VR image display device,
wherein the target image is an image displayed inside a VR space,
wherein the target image is modeled based on the object,
wherein the object is an organ of an animal or a portion thereof,
wherein the main part has at least a surface portion made of a flexible resin material such that the surface portion has a tactile feeling approximately identical to that of the organ,
wherein by utilizing signals generated by the acceleration sensor and the gyro sensor, the synchronization signal is used to synchronize movement, size, and orientation of the main part to movement, size, and orientation of the target image such that the target image is visibly and exactly overlapped with the main part in the VR space,
wherein the acceleration sensor is configured to sense movement in a three-dimensional direction by detecting movement in each axial direction of the three-dimensional direction,
wherein the gyro sensor is configured to detect an angular speed,
wherein the infrared reception sensor is configured to receive infrared rays from a pair of infrared emitters,
wherein the infrared emitters are configured to emit infrared rays to scan a three-dimensional space in which the controller and the external VR image display device are located, and
wherein the infrared reception sensor and the external VR image display device are configured to receive the infrared rays in order to obtain position information.

2. The controller of claim 1, wherein the main part is formed based on data on the shape of the object,
wherein the object is obtained by examining the animal.

3. A method for manufacturing a controller, the method comprising:
a main part formation operation of forming a main part having a shape identical or approximately identical to a shape of an object for education, research, or training; and
a signal transmitter installation operation of installing a signal transmitter on the main part that was formed in the main part formation operation, wherein the signal transmitter has an acceleration sensor, a gyro sensor, and an infrared reception sensor,
wherein the signal transmitter is configured to transmit a signal for synchronizing an operation of the main part and a movement of a target image, which is displayed in an external image display device,
wherein the target image is an image displayed inside a VR space,
wherein the target image is modeled based on the object,
wherein the object is an organ of an animal or a portion thereof,
wherein the main part has at least a surface portion made of a flexible resin material such that the surface portion has a tactile feeling approximately identical to that of the organ,
wherein by utilizing signals generated by the acceleration sensor and the gyro sensor, the synchronization signal is used to synchronize movement, size, and orientation of the main part to movement, size, and orientation of the target image such that the target image is visibly and exactly overlapped with the main part in the VR space,
wherein the acceleration sensor is configured to sense movement in a three-dimensional direction by detecting movement in each axial direction of the three-dimensional direction,
wherein the gyro sensor is configured to detect an angular speed,
wherein the infrared reception sensor is configured to receive infrared rays from a pair of infrared emitters,
wherein the infrared emitters are configured to emit infrared rays to scan a three-dimensional space in which the controller and the external VR image display device are located, and
wherein the infrared reception sensor and the external VR image display device are configured to receive the infrared rays in order to obtain position information.

4. The method of claim 3, wherein the main part formation operation is performed by a 3D printer.

5. A simulated experience system comprising:
an image display device;
a controller comprising a main part formed to have a shape identical or approximately identical to a shape of an object for education, research, or training;
a signal transmitter installed on the main part and configured to transmit a signal for synchronizing an operation of the main part and a movement of a target image, which is displayed in the image display device, and wherein the target image is modeled based on the object, wherein the signal transmitter has an acceleration sensor, a gyro sensor, and an infrared reception sensor;
an infrared emission device having a pair of infrared emitters; and
a computer comprising:
a signal receiver that is connected to the controller and the image display device, wherein the signal receiver is configured to receive the signal transmitted from the signal transmitter;
a calculation part that is connected to the signal receiver, wherein the calculation part is configured to analyze, based on the received signal, an operation of the main part and to calculate operation data;
an image generator that is configured to generate the target image, which is based on data on the shape of the object;
a synchronization processor that is configured to synchronize the operation data that is calculated by the calculation part such that the target image that is generated by the image generator moves in accordance with an operation of the main part; and
an image output part configured to output the target image that is processed by the synchronization processor to the image display device,
wherein the target image is an image displayed inside a VR space,
wherein the object is an organ of an animal or a portion thereof,
wherein the main part has at least a surface portion made of a flexible resin material such that the surface portion has a tactile feeling approximately identical to that of the organ,
wherein by utilizing signals generated by the acceleration sensor and the gyro sensor, the synchronization signal is used to synchronize movement, size, and orientation of the main part to movement, size, and orientation of the target image such that the target image is visibly and exactly overlapped with the main part in the VR space,
wherein the acceleration sensor is configured to sense movement in a three-dimensional direction by detecting movement in each axial direction of the three-dimensional direction,
wherein the gyro sensor is configured to detect an angular speed,
wherein the infrared reception sensor is configured to receive infrared rays from the pair of infrared emitters,
wherein the infrared emitters are configured to emit infrared rays to scan a three-dimensional space in which the controller and the external VR image display device are located, and
wherein the infrared reception sensor and the external VR image display device are configured to receive the infrared rays in order to obtain position information.

6. The system of claim 5, wherein the computer further comprises:
a storage part configured to store additional data related to an organ of an animal or a portion thereof, which is capable of being synthesized with the generated target image;
an additional image generator configured to generate an additional image based on the additional data stored in the storage part; and
an image synthesizer configured to synthesize the additional image, generated by the additional image generator, with the generated target image.

7. A simulated experience method, comprising:
transmitting a signal from a signal transmitter that synchronizes an operation of a main part of a controller and a movement of a target image that is displayed in an image display device, wherein the target image is modeled based on an object, wherein the signal transmitter has an acceleration sensor, a gyro sensor, and an infrared reception sensor;
receiving the signal from the signal transmitter;
analyzing, based on the received signal, an operation of the main part and calculating operation data;
generating the target image based on data on a shape of the object; and
synchronizing the calculated operation data such that the generated target image moves in accordance with the operation of the main part as a synchronized target image; and
outputting the synchronized target image to the image display device,
wherein a user manipulates the target image by touching the controller while observing the target image displayed on the image display device,
wherein the signal transmitter is installed on the main part of the controller,
wherein the main part of the controller is formed to have a shape identical or approximately identical to a shape of the object,
wherein the object is an object for education, research, or training,
wherein the target image is an image displayed inside a VR space,
wherein the object is an organ of an animal or a portion thereof,
wherein the main part has at least a surface portion made of a flexible resin material such that the surface portion has a tactile feeling approximately identical to that of the organ,
wherein by utilizing signals generated by the acceleration sensor and the gyro sensor, the synchronization signal is used to synchronize movement, size, and orientation of the main part to movement, size, and orientation of the target image such that the target image is visibly and exactly overlapped with the main part in the VR space,
wherein the acceleration sensor is configured to sense movement in a three-dimensional direction by detecting movement in each axial direction of the three-dimensional direction,
wherein the gyro sensor is configured to detect an angular speed,
wherein the infrared reception sensor is configured to receive infrared rays from a pair of infrared emitters, wherein the infrared emitters are configured to emit the infrared rays to scan a three-dimensional space in which the controller and the external VR image display device are located, and wherein the infrared reception sensor and the external VR image display device are configured to receive the infrared rays in order to obtain position information.

* * * * *